United States Patent [19]

Borzym

[11] Patent Number: 4,872,384
[45] Date of Patent: Oct. 10, 1989

[54] TUBE CUTTING APPARATUS

[76] Inventor: John J. Borzym, 4820 School Bell La., Birmingham, Mich. 48010

[21] Appl. No.: 149,837

[22] Filed: Jan. 29, 1988

[51] Int. Cl.$^4$ ............................................. B23D 21/00
[52] U.S. Cl. ......................................... 83/454; 83/54; 83/456; 83/698
[58] Field of Search .................. 83/454, 319, 54, 300, 83/382, 456, 519, 698, 699

[56] References Cited

U.S. PATENT DOCUMENTS

| | | | |
|---|---|---|---|
| 1,311,078 | 7/1919 | Kucera | 30/514 |
| 3,542,097 | 11/1970 | Dudek | 30/392 |
| 4,499,803 | 2/1985 | Borzym et al. | 83/54 X |

Primary Examiner—Donald R. Schran
Attorney, Agent, or Firm—Dykema Gossett

[57] ABSTRACT

A tube cutting apparatus of the type in which jaws carried by relative reciprocal slides move into and out of clamping engagement with tubing, the clamped tubing is thereof notched at its upper periphery with a scarfing blade, and the notched tubing is thereafter severed with a guillotine blade. The scarfing blade and the guillotine blade each are secured to their respective holders by a cam pin which coacts with a cam surface to bring an eccentric portion of the cam pin into wedging coaction with the blade in response to rotation of the pin and firmly and wedgingly secure the blade to its respective holder. The blade may be removed from the respective holder by simply rotating the cam pin a fraction of a revolution and then withdrawing the blade. A new or reground blade is replaced in the respective holder by simple insertion into the holder and rotation of the cam pin a fraction of a revolution in the opposite direction.

17 Claims, 4 Drawing Sheets

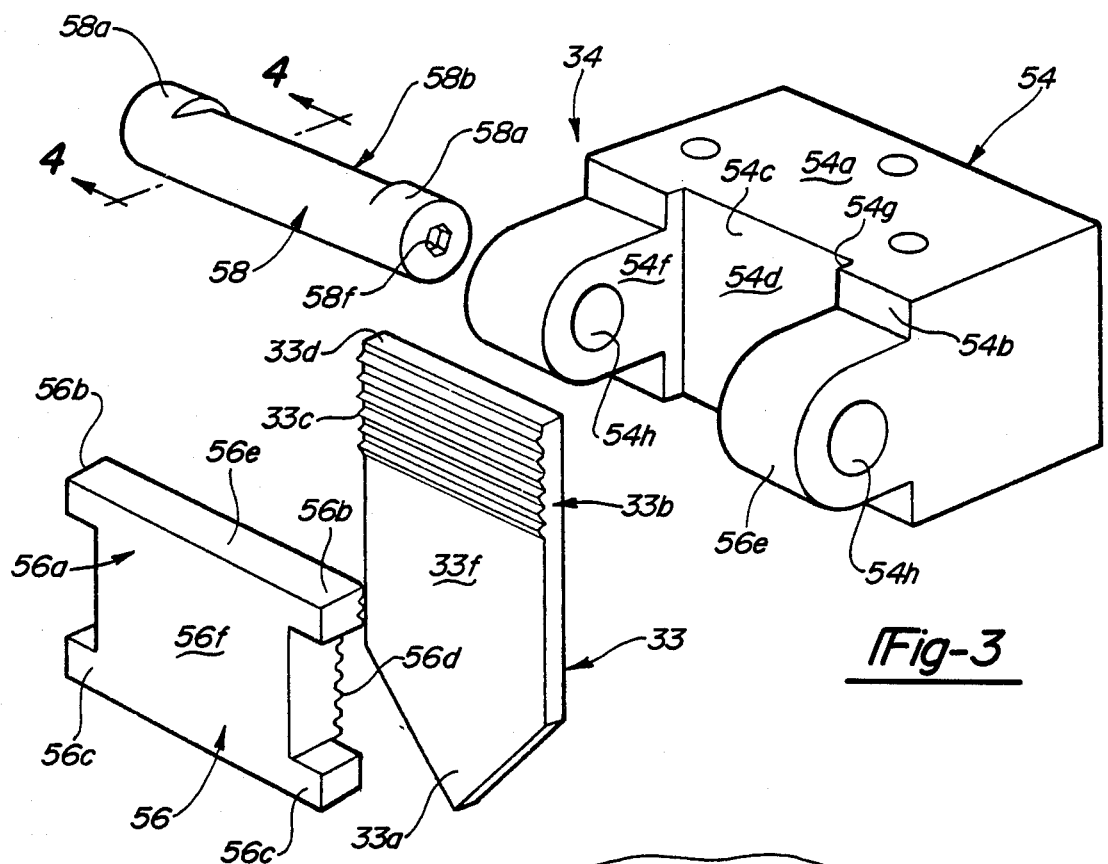
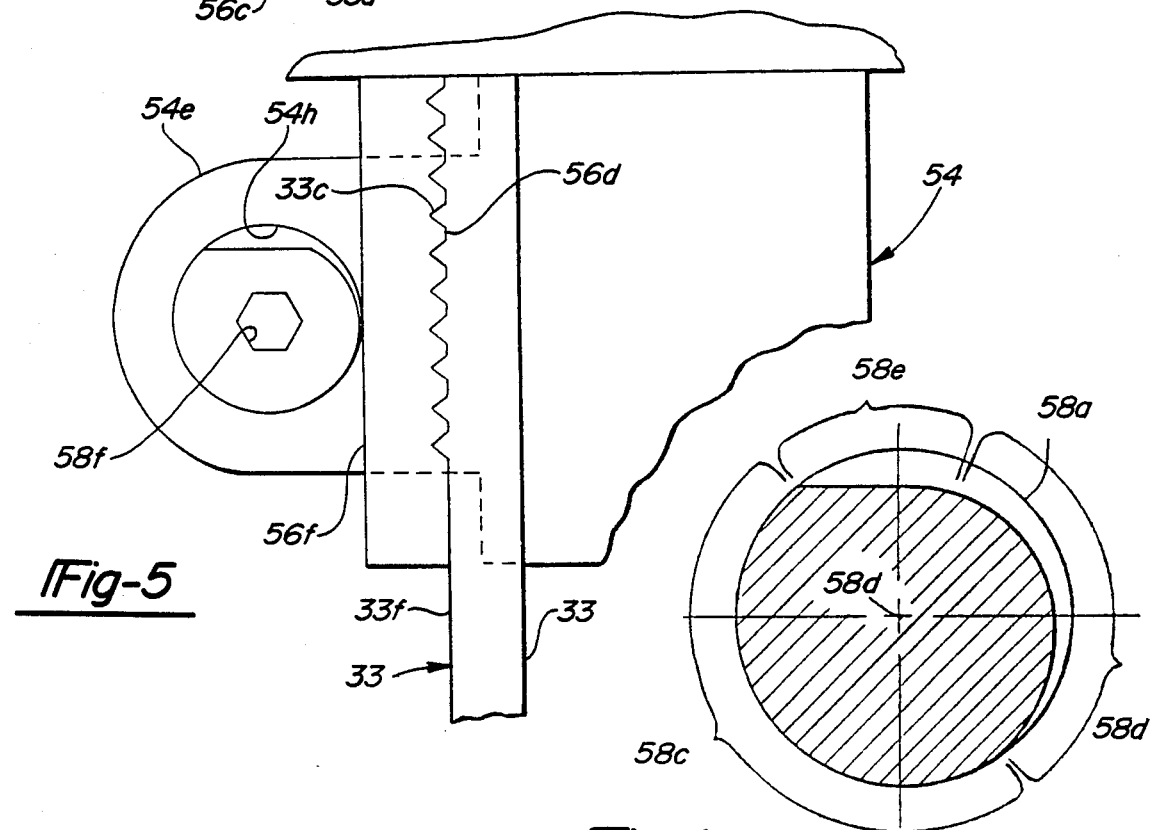
Fig-3
Fig-5
Fig-4

TUBE CUTTING APPARATUS

Field of the Invention

This invention relates generally to guillotine type stock cutting apparatus and particularly to the improvement in the manner in which the cutting element or elements of the apparatus are secured to and removed from their respective holder members.

BACKGROUND OF THE INVENTION

Stock cutting apparatus of the guillotine type is well known in the art as is exemplified by U.S. Pat. Nos. 3,938,415; 4,108,029 and 4,294,127 owned by the assignee of the present invention, the entire disclosures of which patents are incorporated herein by reference. While the prior art machines disclosed in these patents are both highly efficient and well suited for the intended purpose, certain aspects thereof are nevertheless subject to improvement.

Tubing and other types of metal stock are frequently manufactured in continuous, high-speed forming mills. Hundreds of feet of finished stock emanate from these mills at high speed, necessitating use of a cut-off apparatus at the terminal end of the mill to cut the stock into manageable lengths.

Tooling in the cut-off apparatus must be in good condition, matched to the stock and precisely located to produce acceptable results. Tool changeover means down time, lost production and lost revenue. Therefore, it must be minimized, but without a sacrifice in performance quality.

Changing blades in a guillotine cut-off, particularly a "double-cut" system having both notching and severing blades, means handling a number of bolts, each of which is easily damaged, or lost, or corrupted with dirt and/or foreign matter. It would greatly facilitate the blade changeover to eliminate the use of bolts.

SUMMARY OF THE INVENTION

This invention is directed to the provision of a tube cutting apparatus in which the notching blade and the guillotine blade may be quickly and readily replaced.

The tube cutting apparatus of the invention is of the general type including clamping means arranged to be moved into clamping relation to the elongated workpiece, a blade holder, a blade, and means operative to move the blade across the path of the workpiece following clamping of the workpiece by the clamping means. According to the invention, the apparatus further includes a wedge member which is movable between a locked position in which the blade is locked to the blade holder and a released position in which the blade is released from the blade holder. This arrangement allows the blade to be simply and quickly removed from the blade holder for regrinding and/or replacement.

According to a further feature of the invention, the wedge member comprises a pin member mounted for rotation about its lengthwise axis between its locked and released position and the pin member includes a circumferential wedging surface thereon eccentric with respect to the rotational axis of the pin. This arrangement allows the pin to be rotated to bring the eccentric wedging surface thereon into locking coaction with a suitable surface on the blade to lock the blade to the blade holder.

In one aspect of the invention, the blade comprises a guillotine blade mounted for vertical movement across the path of the stock to sever the stock. In this aspect of the invention, the blade holder defines a generally vertical clamping surface; one side face of the upper end portion of the blade is positioned against the clamping surface on the blade holder; and the blade upper end portion is lockingly clamped against the clamp surface on the blade holder in response to rotation of the pin to its locked position.

According to a further feature of this aspect of the invention, the tube cutting apparatus further includes a clamp plate carried by the blade holder and positioned at one side face thereof against the other side face of the blade upper portion, and the eccentric surface on the pin cammingly engages the other side face of the clamping plate in response to rotation of the pin to its locked position to clamp the blade upper portion between the clamping surface on the blade holder and the clamping plate. This arrangement allows a simple and positive means of clamping the blade to the blade holder in response to a simple rotation of the lock pin.

According to a further feature of this aspect of the invention, the other side face of the blade upper portion and the one side face of the clamping plate have complementary interengaging series of vertically spaced teeth which augment the locking action of the pin and provide selective vertical adjustment of the blade on the blade holder.

According to a further feature of this aspect of the invention, the blade holder includes a pair of transversely spaced lugs on opposite sides of the clamping surface; the pin is journalled at its opposite ends in the spaced lugs; and the clamping plate is positioned between the lugs. This arrangement provides a compact package for effectively clamping the blade to the blade holder in response to pin rotation.

According to a further feature of this aspect of the invention, the clamping plate includes a pair of oppositely extending upper arm portions guiding on the respective upper faces of the lugs and a pair of oppositely extending lower arm portions guiding on the respective lower faces of the lugs. This arrangement provides a simple and effective means of guiding the clamping member in its clamping action.

According to another aspect of the invention, the blade comprises a notching blade mounted for horizontal movement across the path of the stock to provide a notch in the periphery of the stock prior to a subsequent severing action.

According to a feature of this aspect of the invention, the notching blade includes a cutting portion and a handle portion defining a cam face, and the wedging surface on the pin is moved into wedging coaction with the cam face on the handle portion of the notching blade as the pin is moved to its locked position.

According to a further feature of this aspect of the invention, the blade holder comprises a block member having a bore therein; the pin is journalled in the bore; the notching blade handle portion is mounted on the block member with a side edge thereof intersecting the bore in the block member; and the side edge of the blade handle portion is cut away and defines the cam face for coaction with the wedging surface on the pin as the pin is rotated in the bore of the block member to its locked position.

According to a further feature of this aspect of the invention, the bore in the blade holder block member opens adjacent a side face of the block member; the blade is mounted on the block member side face in intersecting relation to the opening of the bore in the block member side face; the die set further includes a cover plate positioned against the block member side face with the blade positioned between the cover plate and the block member and an access hole in the cover plate aligned with the bore in the block member; and the pin includes a journal portion journalled in the block member bore, a wrenching access portion positioned in the access hole in the cover plate, and an eccentric portion defining the wedging surface and axially aligned with the blade. With this arrangement, simple rotation of the pin member brings the wedging surface on the pin member into locking coaction with the cam face defined by the cut away in the handle portion of the notching blade.

According to a further feature of this aspect of the invention, the eccentric portion of the pin member further defines a flat surface which may be rotated into alignment with the side edge of the blade handle portion to allow withdrawal of the blade from the blade holder. This arrangement allows the blade to be simply and quickly removed from and replaced in the blade holder.

BRIEF DESCRIPTION OF THE DRAWINGS

FIG. 3 is an exploded perspective view of a guillotine blade assembly for use in the tube cutting apparatus of FIGS. 1 and 2;

FIG. 4 is an end view of a pin member employed in the guillotine blade assembly of FIG. 3;

FIG. 5 is a fragmentary cross-sectional view of the guillotine blade assembly;

DETAILED DESCRIPTION OF THE PREFERRED EMBODIMENT

Figure 1:
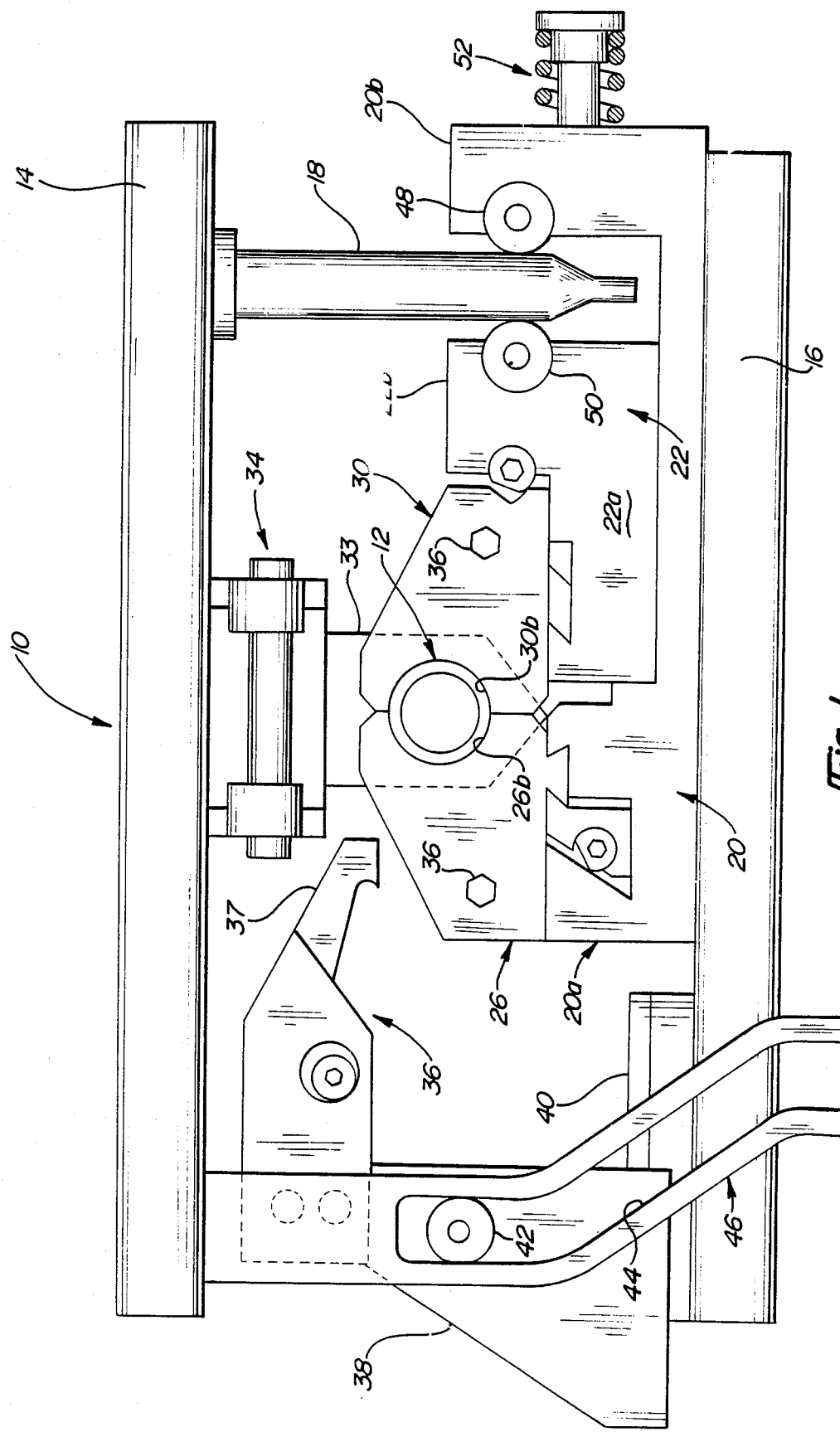
FIG. 1 is an elevational somewhat diagrammatic view of a tube cutting apparatus according to the invention.

The improved tube cutting apparatus of the present invention includes a die set generally designated by the numeral 10. Die set 10 is adapted to be mounted within a die press or the like (not shown) for slidable movement along a rail set (not shown) within the press. The press normally includes a swinging or orbiting type ram mechanism which serves to drive the die set 10. Die sets of this type operate by the ram mechanism first causing clamping of the rapidly moving length of tubing 12, with the cut-off apparatus being positioned to receive the elongated tubing stock as the latter emanates from a source (not shown) thereof, such as a fabrication mill. The die set 10, clamped to the moving tubing 12, moves with the latter along the rail set while the ram mechanism drives a main guillotine type severing blade in a reciprocating fashion to shear a slug from the tubing 12 and thereby sever a length of the tubing. The cut-off operation as described above is normally preceded by a notching operation wherein a notching blade is driven through a portion of the periphery of the tubing 12 in the plane of the severing blade in order to cut a notch in the periphery of the tubing 12 to facilitate a clean cut by the severing blade. The ram mechanism is then operated in a reverse manner to retract the severing blade, unclamp the die set 10 from the tubing 12, and return the die set on the rail set to its starting position, prior to the initiation of a new cut-off cycle.

Die set 10 includes an upper shoe 14, a lower shoe or base 16, and a wedge type cam 18 which is secured to upper shoe 14 and depends downwardly therefrom.

First and second holder members in the form of upper and lower slide members 20 and 22 are slidably mounted on base 16 for horizontal reciprocating movement relative to each other upon operation of the ram mechanism. A first set of jaw members 24 and 26 are mounted in axially spaced relation on a horizontal mounting surface defined by the top face of a platform portion 20a of slide member 20, and a second pair of jaw members 28 and 30 are mounted in axially spaced location on a horizontal mounting surface defined by the top face of a platform portion 22a of slide member 22. Jaw members 24, 26, 28 and 30 each include a main body portion 24a, 26a, 28a, 30a and each define an arcuate clamping surface (only clamping surfaces 26b and 30b are shown) contoured to conform to the exterior shape of tubing 12. A gap or slot 32 is defined between axially spaced jaws 24 and 26 and axially spaced jaws 28 and 30 for passage of the blade 33 of a guillotine or severing blade assembly 34 to sever a length of tubing 12 held in clamping fashion between jaws 24, 26, 28 and 30.

Jaw members 24 and 26 are mounted in axially spaced relation on platform portion 20a of slide member 20 by a spacer 35 positioned between the jaw members. Spacer 35 is received in notches 24c and 26c in jaw members 24 and 26 and includes a lower rib portion 35a received in a groove 20c in platform portion 20a of slide member 20. A similar spacer is positioned between jaws 28 and 30. A bolt 36 extends through aligned axial bores in jaw member 26, spacer 35, and jaw member 24 for coaction with a nut to clamp jaw members 24 and 26 to spacer 35. Another bolt 36 similarly clamps jaw members 28 and 30 to the spacer member 35 positioned therebetween.

A slotting or scarfing blade assembly 37 is secured to a cross slide 38 which in turn is mounted for horizontal reciprocation in a direction perpendicular to the travel of tubing 12 by means of a slide rail 40 mounted on base member 16. A cam roller 42 is mounted on cross slide 38 and is confined for movement on the inside track 44 of a curved cam 46 which extends downwardly from upper shoe 14 so that vertical movement of upper shoe 14 relative to base 16 moves cam 46 vertically relative to cam roller 42 to thereby move the scarfing blade 47 of scarfing blade assembly 36 transversely with respect to the path of the tubing to accomplish a tube notching operation preparatory to the severing operation of guillotine assembly 34.

Slide members 20 and 22 are caused to move toward and away from each other by the action of wedge cam 18 coacting with cam rollers 48 and 50 carried respectively on tower portions 20b, 22b of slides 20 and 22 so that upward and downward movement of wedge cam 18 in response to upward and downward movement of upper shoe 14 produces opening and closing of slide members 20 and 22 relative to each other in coaction with a spring assembly seen generally at 52. Further details of a wedge and cam roller construction of the type seen schematically in FIG. 1 are disclosed in U.S. Pat. No. 4,294,147 assigned to the assignee of the present application, and further details of the manner in which jaws 24, 26, 28 and 30 are releasably clamped to slide members 20 and 22 are disclosed in applicant's copending application Ser. No. 149,428 filed the same day as the present application.

The present invention specifically concerns the manner in which guillotine blade 33 of severing blade assembly 34 is secured to and removed from the severing blade assembly and the manner in which scarfing blade 47 of scarfing blade assembly 37 is secured and removed from the scarfing blade assembly.

Guillotine blade assembly 34 is best seen in FIGS. 3, 4 and 5. Guillotine blade assembly 34, in addition to guillotine blade 33, includes a blade holder 54, a clamping plate 56, and a pin member 58.

Blade holder 54 is of generally block configuration and includes a generally rectangular main body portion 54a including a front face 54b and a central notch 54c formed in the front face and defining a vertical clamping surface 54d; a pair of lug portions 54e extending forwardly from front face 54b in transversely spaced relation with their inboard vertical faces 54f flush with side vertical edges 54g of notch 54c; and bores 54h provided in lug portions 54e.

Guillotine blade 33 is sized to fit in notch 54c between lug portions 54e of the holder member and includes a lower cutting portion 33a and an upper handle portion 33b. Upper handle portion 33b is of generally flat rectangular configuration and including a series of vertically spaced transversely extending teeth 34c extending downwardly from the top edge 34d thereof.

Clamping plate 56 has a generally H configuration and includes a main body generally rectangular portion 56a, a pair of oppositely extending upper arm portions 56b, a pair of oppositely extending lower arm portions 56c, and a series of vertically spaced transversely extending teeth 56d extending downwardly from the upper edge 56e of the clamping plate and complementary to the teeth 34c on blade 33.

Pin member 58 includes journal portions 58a at each end thereof for journalling receipt in bores 54h, and a central wedging portion 58b. Wedging portion 58b, in transverse cross section and as best seen in FIGS. 4 and 5, includes a circular portion 58c centered on the center 58d of the pin, an eccentric portion 58d of gradually decreasing radius with respect to center 58d, and a flat or chordal portion 58e.

Figure 2:
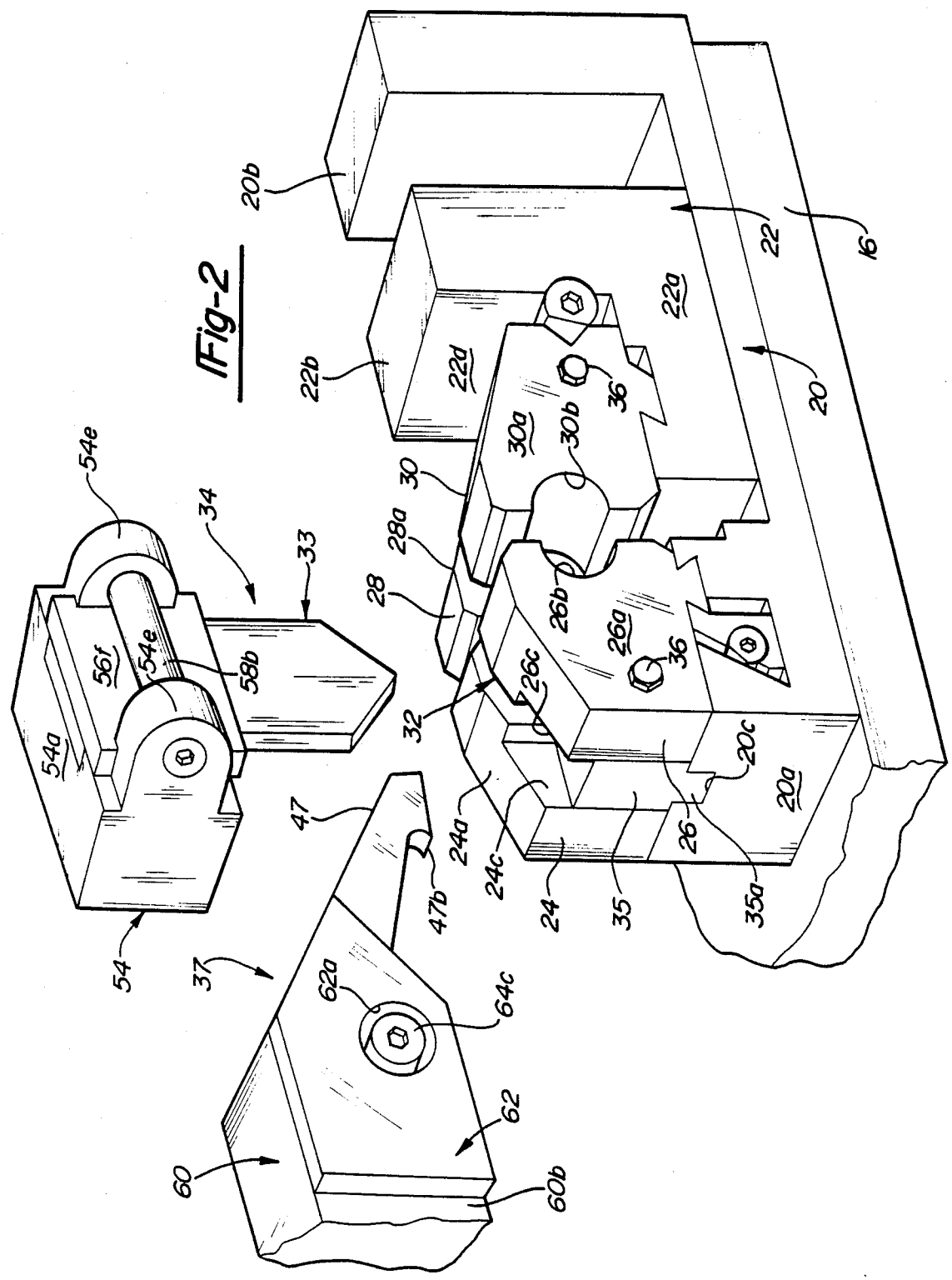
FIG. 2 is a fragmentary perspective view of the tube cutting apparatus of FIG. 1.

The assembled relation of the guillotine blade assembly is best seen in FIGS. 2 and 5. In assembled relation, holder 54 is secured at its upper face to the lower face of upper shoe 14 of the cut-off die set 10; blade 33 is positioned in notch 54c with the rear side face 33e of handle portion 33b positioned against clamping surface 54d on the holder member and with the upper edge 33d of the blade generally flush with the upper face of the main body portion of the holder member; clamping plate 56 is positioned in straddling fashion over lugs 54e with teeth 56d in confronting relation to teeth 33c on the blade and with arm portions 56b guiding on the respective upper faces of lugs 54e and arm portions 56c guiding on the respective lower faces of lugs 54e; and pin 58 extends between lugs 54e with journal portions 58a journalled in bores 54h and eccentric portion 58b wedgingly coacting with the front face 56f of clamping plate 56 to wedgingly secure blade 33 to the blade holder. Specifically, and as best seen in FIG. 5, as pin 58 is rotated by insertion of a suitable wrenching tool in a socket 58f provided in the end of the pin, eccentric surface 58d is gradually brought into wedging and camming relationship with front face 56f of clamping plate 56 to press the clamping plate against the blade and clamp the blade between the clamp member and the clamping surface 54d on the blade holder. As the clamp plate 56 is moved into wedging coaction with blade 33, teeth 56d on the clamping plate interengage and lockingly coact with teeth 33c on the blade to provide a positive vertical lock to augment the clamping action resulting from the rotation of the pin member. As seen in FIG. 5, counterclockwise rotation of the pin member produces clamping of the blade to the clamping face and clockwise rotation of the pin releases the clamp member to allow the teeth 33c, 56d to be disengaged and allow the blade to be removed from the blade holder by downward movement of the blade relative to the blade holder. A new or reground blade is reinstalled in the guillotine blade assembly by pressing the new blade upwardly into notch 54c and then rotating pin member 58 in a counterclockwise direction to reestablish the clamping and interlocking relationship between clamping plate 56, blade 33, and blade holder 54. It will be appreciated, that in the released position of pin 58, flat 58e extends essentially parallel to the front face 56f of clamp plate 56 to allow axial separation of the clamp plate to disengage the intermeshing teeth.

The described guillotine blade assembly further provides a ready and convenient means of adjusting the vertical position of blade 33 with respect to the blade holder 54. Specifically, if it is desired to adjust the vertical position of the blade relative to the blade holder, pin 58 is simply turned in a clockwise direction as seen in FIG. 5 to bring flat 58e into parallel relationship to front face 56f of the clamping plate, the blade is adjusted upwardly or downwardly as desired, and pin 58 is turned in a counterclockwise direction to being eccentric surface 58d into wedging coaction with the front face 58f of the clamping plate and reengage locking teeth 33c and 56d.

Figure 6:
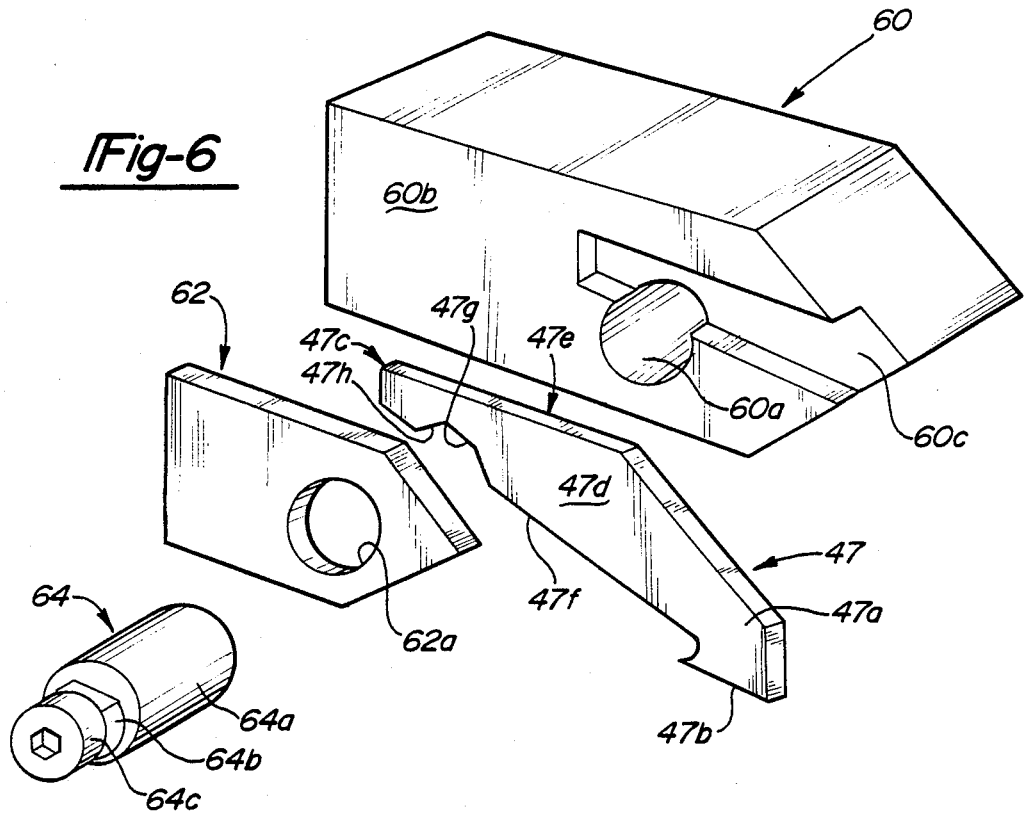
FIG. 6 is an exploded perspective view of a notching blade assembly employed in the cutting apparatus of FIGS. 1 and 2.
Figure 7:
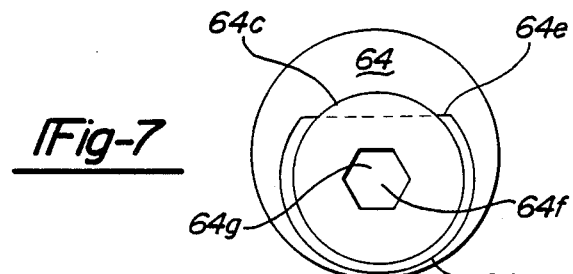
FIG. 7 is an end view of a pin member employed in the notching assembly of FIG. 6.
Figure 8:
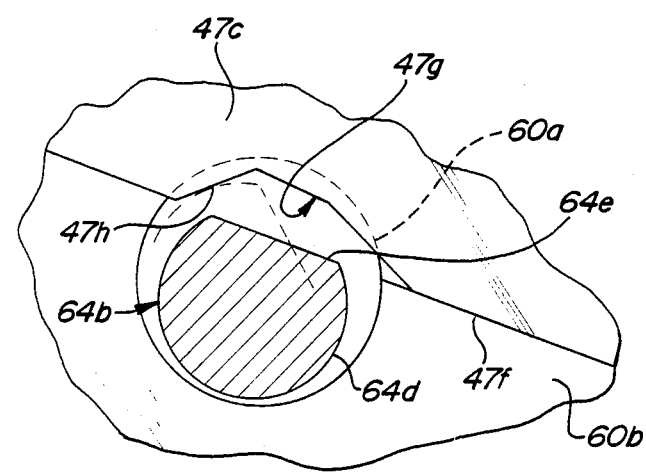
FIG. 8 is a fragmentary cross-sectional view of the notching blade assembly of FIG. 6.

As best seen in FIGS. 6, 7 and 8, scarfing or notching blade assembly 37, in addition to scarfing blade 47, includes a blade holder 60 of generally rectangular or block configuration; a cover plate 62; and a pin 64.

Scarfing or notching blade 47 has a generally flat configuration and includes a blade portion 47a defining a scarfing knife edge 47b, and a handle portion 47c having a front face 47d, a rear face 47e and a lower edge 47f. Lower side edge 47f is cut away adjacent the remote end of the handle portion to define a notch 47g defining a cam surface 47h.

Blade holder 60 includes a bore 60a opening in the front face 60b of the holder member in a groove 60c having a diverging configuration generally matching the shape of handle portion 47c of the guillotine blade and intersecting the upper portion of bore 60a. Groove 60 has a depth measuring rearward from the front face 60b of the holder member slightly greater than the thickness of blade 47.

Cover plate 62 has a configuration generally matching the configuration of front face 60b of holder member 60 and includes an access hole 62a.

Pin 64 includes a journal portion 64a, an eccentric portion 64b, and a wrenching portion 64c. Journal portion 64a is sized to mount rotatably in bore 60a. Eccentric portion 64b, as best seen in FIG. 7, includes a circular portion 64d and a flat or chordal portion 64e. Circular portion 64d is centered on a point 64f which is offset with respect to the axis 64g of journal portion 64a and is therefore eccentric with respect to that axis.

In the assembled relation of a guillotine assembly, as best seen in FIGS. 2 and 8, handle portion 47c of blade 47 is positioned in notch 60c with the blade portion 47a projecting outwardly from the holder member and notch 47g intersecting bore 60a; cover plate 62 is suitably secured to the front face 60b of holder member 60 to trap the blade in notch 60c; and pin 64 is positioned with its journal portion 64a journalled in holder member bore 60a, its wrench access portion 64c positioned in cover plate access hole 62a, and its eccentric portion 64b positioned in underlying relation to notch 47g in blade handle portion 47c.

As best seen in FIG. 8, as the pin 64 is turned clockwise, the eccentric surface 64d is brought into wedging coaction with cam face 47h on the blade to securely lock the blade to the blade holder. Conversely, as the pin is rotated counterclockwise as viewed in FIG. 8, eccentric surface 64d moves away from cam surface 47h to release the blade. The locked position of pin 64 is seen in dotted lines in FIG. 8 and the released position of pin 64 is seen in solid lines in FIG. 8. To release a blade 37 from blade holder 60, pin 64 is rotated counterclockwise until flat 64e is parallel to the lower edge 47f of the blade, whereupon the blade may be withdrawn axially from the blade holder. The new or reground blade is reinstalled into the blade holder by axial movement into notch 60 with lower edge 47f again clearing the pin 64 by virtue of the position of flat 64e parallel to blade edge 47f. After the blade has been reinstalled, pin 64 is again rotated clockwise to the dotted line position of FIG. 8 where it cammingly and wedgingly coacts with cam surface 47h to securely lock the new blade to the blade holder.

The invention will be seen to provide a means of replacing the guillotine blade or the scarfing blade of a tube cutting apparatus in a simple and very quick operation. Specifically, the respective blade may be replaced by simply rotating a cam pin through a minor fraction of a revolution, axially withdrawing the blade, reinserting a new or reground blade, and again rotating the pin member in the opposite direction through a minor fraction of a revolution. The invention thus provides a means of replacing blades very quickly with resultant savings in operating time and therefore significant savings in the operating cost of the cutting apparatus. Further, the invention provides a means of rapidly changing the blades of the cutting apparatus while yet retaining the blades in a firmly locked position relative to the holder members during normal use of the apparatus.

Whereas a preferred embodiment of the invention has been illustrated and described in detail, it will be apparent that various changes may be made in the disclosed embodiment without departing from the scope or spirit of the invention.

I claim:

1. A tube cutting apparatus comprising:
   clamping means operative to clamp tubular stock;
   a blade holder;
   a blade;
   a wedge member movable between a locked position in which said blade is locked to said blade holder and a released position in which said blade is released from said blade holder; and
   a clamping plate carried by said blade holder and positioned at one side face thereof against said blade;
   said wedge member cammingly engaging the other side face of said clamping plate in response to movement of said wedge member to its locked position to clamp said blade upper portion between said blade holder and said clamping plate;
   said one side face of said clamping plate and said blade having complimentary inter-engaging teeth which augment the locking action of said wedge member and provide selective vertical adjustment of said blade in said blade holder.

2. A tube cutting apparatus according to claim 1 wherein:
   said wedge member comprises a pin mounted for rotation about its lengthwise axis between said locked and released positions and including a circumferential wedging surface thereon eccentric with respect to said axis.

3. A tube cutting apparatus set according to claim 2 wherein:
   said pin is mounted for rotation in said holder member.

4. A tube cutting apparatus according to claim 3 wherein:
   (G) said blade comprises a guillotine blade mounted for movement across the path of said stock to sever said stock.

5. A tube cutting apparatus according to claim 4 wherein:
   said apparatus further includes a vertically movable carrier member;
   said blade holder is secured to said carrier member and defines a generally vertical clamping surface;
   one side face of the upper end portion of said blade is positioned against said clamping surface; and
   said blade upper end portion is lockingly clamped against said clamp surface in response to rotation of said pin to its locked position.

6. The tube cutting apparatus according to claim 5 wherein:
   said clamping plate is positioned at one side face thereof against the other side face of said blade upper portion; and
   said eccentric surface on said pin cammingly engages the other side face of said clamping plate in response to rotation of said pin to its locked position to clamp said blade upper portion between said clamping surface and said clamping plate.

7. A tube cutting apparatus according to claim 5 wherein:
   said other side face of said blade upper portion and said one side face of said clamping plate have complementary interengaging series of vertically spaced teeth which augment the locking action of said pin and provide selective vertical adjustment of said blade in said blade holder.

8. A tube cutting apparatus according to claim 5 wherein:
   said blade holder includes a pair of transversely spaced lugs on opposite sides of said clamping surface;
   said pin is journalled at its opposite ends in said lugs; and
   said clamping plate is positioned between said lugs.

9. A tube cutting apparatus according to claim 7 wherein:
   said clamping plate includes a pair of oppositely extending upper arm portions guiding on the respective upper faces of said lugs and a pair of oppositely extending lower arm portions guiding on the respective lower faces of said lugs.

10. A guillotine blade assembly for severing elongated stock, said guillotine blade assembly comprising:
(A) a blade holder defining a generally vertical clamping surface;
(B) a blade including a lower cutting portion and a flat upper handle portion having one side face positioned against said clamping surface;
(C) a pin mounted for rotation in said blade holder and including an eccentric wedging surface operative in response to rotation of said pin to clamp said blade handle portion against said clamping surface
(D) and a clamping plate carried by said blade holder and positioned at one side face thereof against the other side face of said blade upper portion;
(E) said eccentric surface on said pin cammingly engaging the other side face of said clamping plate in response to rotation of said pin to clamp said blade upper portion between said clamping surface and said clamping plate.

11. A guillotine blade assembly according to claim 10 wherein said other side face of said blade upper portion and said one side face of said clamping plate having complementary interengaging series of vertically spaced teeth which augment the locking action of said pin and provide selective vertical adjustment of said blade in said blade holder.

12. A guillotine blade assembly according to claim 11 wherein:
(F) said blade holder includes a pair of transversely spaced lugs on opposite sides of said clamping surface;
(G) said pin is journalled at its opposite ends in said lugs; and
(H) said clamping plate is positioned between said lugs.

13. A guillotine blade assembly according to claim 12 wherein:
(I) said clamping plate includes a pair of oppositely extending upper arm portions guiding on the respective upper face of said lugs and a pair of oppositely extending lower arm portions guiding on the respective lower faces of said lugs.

14. A notching blade assembly for notching elongated stock prior to a severing operation, said notching blade assembly comprising:

(A) a blade holder;
(B) a notching blade including a cutting portion and a handle portion mounted on said blade holder and defining a recessed cam face; and
(C) a pin journalled in said blade holder and including an eccentric wedging surface engagable with said recessed cam face on said handle portion of said notching blade in response to rotation of said pin and operative when rotated to lock said blade to said blade holder.

15. A notching blade assembly according to claim 14 wherein:
(D) said blade holder comprises a block member having a bore therein;
(E) said pin is journalled in said bore;
(F) said notching blade handle portion is mounted on said block member with a side edge thereof intersecting said bore; and
(G) said side edge is cut away and defines said cam face for coaction with said eccentric surface on said pin as said pin is rotated to its locking position.

16. A notching blade assembly according to claim 15 wherein:
(H) said bore opens adjacent a side face of said block member;
(I) said blade is mounted on said block member side face in intersecting relation to the opening of said bore in said block member side face;
(J) said notching blade assembly further includes a cover plate positioned against said block member side face with said blade positioned between said cover plate and said block member and an access hole in said cover plate aligned with said block member bore; and
(K) said pin includes a journal portion journalled in said block member bore, a wrenching access portion positioned in said cover plate access hole, and an eccentric portion defining said wedging surface and aligned with said blade.

17. A notching blade assembly according to claim 16 wherein:
(L) said eccentric portion of said pin further defines a flat surface which may be rotated into alignment with said side edge of said blade handle portion to allow withdrawal of said blade from said blade holder.

* * * * *